Patented Jan. 15, 1946

2,393,206

UNITED STATES PATENT OFFICE 2,393,206

SYNTHETIC RUBBERLIKE EMULSION CO-POLYMERIZATES AND PROCESS OF PRO-DUCING SAME

Byron M. Vanderbilt, Westfield, N. J., assignor to Standard Oil Development Company, a corporation of Delaware No Drawing. Application August 14, 1942, Serial No. 454,754

7 Claims. (Cl. 260—84.5)

The present invention pertains to the production of synthetic rubber-like materials and particularly to a rubber-like material of a soft and plastic nature which is highly resistant to mineral and coal tar oils and solvents in general.

It is an object of the present invention to provide the art with a novel method of preparing synthetic rubber-like materials by the interpolymerization of a diolefin hydrocarbon and a nitrile of a low molecular unsaturated carboxylic acid in aqueous emulsion.

It is also an object of this invention to provide the art with a novel method whereby interpolymerization products of a diolefin hydrocarbon and a nitrile of vastly improved properties are obtained.

A further object of my invention is to provide the art with certain new and greatly improved interpolymers of a diolefin and a nitrile.

These and other objects will appear more clearly from the following detailed description.

It has been known for some time that diolefins such as butadiene and its homologues may be interpolymerized with nitriles of acrylic acid or alpha substituted acrylic acids in aqueous emulsion to form polymerizates which are rubber-like in character and vastly superior to natural rubber in their resistance to oils and solvents. The preparation of such polymers is described, for example, in U. S. Patent No. 1,973,000. Polymers have been prepared in accordance with the teachings of this patent and it has been found that polymerizates of substantially uniform composition and of good physical properties, i. e., tensile strength, elongation and plasticity can be obtained if the ratio of diolefin/nitrile is maintained at about 75/25 to 70/30.

When a mixture of 74 parts of butadiene is copolymerized with 26 parts of acrylonitrile it has been found that the two monomers enter into the copolymerization in practically the same proportion at which they are present in the feed and, for example, the copolymer obtained at 50% conversion contains the same percentage of nitrogen as that obtained at 80%. However, when the proportion of acrylonitrile in the feed is increased to over about 30%, a lower proportion of nitrile enters into the reaction than is present in the feed. As a result the ratio of unreacted nitrile to unreacted diolefin increases as the reaction progresses which in turn results in non-uniform products.

When the proportion of the diolefin is increased about about 75%, the properties of the diene-nitrile copolymer approach that of the poly-diene prepared in a like manner. Not only are such copolymers inferior to those of higher nitrile content in resistance to mineral and coal tar oils, but they have inferior physical properties as well. Such properties include tensile strength, elongation, and modulus properties of the vulcanizate. There is also a very definite decrease in plasticity and processability of the copolymer when the nitrile content is decreased below about 25%.

It has been found, however, that when the ratio of nitrile to diolefin in the polymerization mixture is increased to ratios of about 2/3 or 1/1 or even higher, in order to increase the nitrile content of the polymer above about 35% and thereby to further increase solvent resistance of the polymerizates, the physical properties of the product formed deteriorate so that it becomes increasingly difficult to process them and copolymers containing more than about 40% of the nitrile are of resinous character and are practically impossible to process on ordinary rubber processing equipment. When the proportion of nitrile in the product increases above about 35%, the copolymer becomes more resinous and at high nitrile concentrations the copolymers approach the properties of polyacrylonitrile. Thus from the standpoint of overall physical properties a butadiene-acrylonitrile copolymer containing from about 25–35% of the nitrile is optimum. However, such copolymers are not sufficiently resistant to mineral and coal tar oils for many industrial uses. This invention provides a method whereby copolymers of diolefins and acrylonitrile and its alpha homologs can be prepared containing more than 35% of the nitrile, but still retaining satisfactory overall properties such as plasticity, tensile strength and elongation.

I have found that polymerizates containing more than 35% of combined nitrile and yet possessing good physical properties can be prepared by the interpolymerization of the diolefin and a nitrile in aqueous emulsion if a uniformly high ratio of nitrile to diolefin is utilized and the diolefin is added to the polymerization mixture in several portions. By proceeding in this manner I have obtained interpolymers containing as high as 40 to 50% of combined nitrile which are more plastic, have better elongation characteristics and are more resistant to the action of motor fuels than products obtained in the usual manner wherein all of the diolefin is added initially to the polymerization mixture.

The diolefins which may be used in accordance with my invention includes butadiene-1.3 and the homologues thereof such as isoprene, piperylene and/or 2,3-dimethyl butadiene-1,3. The nitriles which may be used, correspond to the formula

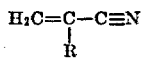

wherein R stands for hydrogen or a lower alkyl group such as methyl, ethyl or the like.

The polymerization is effected in aqueous emulsion generally using a soap such as sodium oleate or palmitate or any suitable surface active agent such as sodium lauryl sulfate, salts of alkylated sulfonic acids, long chain alkyl amine salts and the like, as emulsifiers. The polymerization is catalyzed by the use of a compound capable of liberating oxygen under the conditions applied in the polymerization such as hydrogen peroxide or alkali metal or ammonium perborates or persulfates. It is also preferred that a modifier be provided in the polymerization mixtures. Such modifiers include mercaptans containing at least about 6 carbon atoms in an aliphatic linkage and preferably about 8–14 carbon atoms. The polymerization mixture usually contains the reactants and water in the ratio of about 1/2.

In accordance with my invention, from about 25 to 75% of the total diolefin is added to the polymerization mixture initially and the remainder is added, preferably in two or more portions when conversions of about 30 to about 50% are reached.

The following examples will illustrate my invention but it is to be understood that the invention is not limited thereto:

Example 1

5200 parts of water containing 1.1% of sodium lauryl sulfate, 0.2% of sodium bicarbonate, and 0.125% of ammonium persulfate was emulsified with 2600 g. of a 50/50 mixture of butadiene and acrylonitrile. The latter contained 6.5 g. of aliphatic mercaptans which were predominantly $C_{12}$ in composition. The emulsion was prepared in a 3-gallon pressure vessel equipped with an agitator. The emulsion was heated at 30° C. for 3 hours and then the temperature was raised to 35° C. The reaction was soon so exothermic that cooling was necessary. An additional 3.25 g. of mercaptans was added after 3 hours and again at 50% conversion. After a total reaction time of 10½ hours the resultant latex was removed from the reactor, the butadiene allowed to flash off, and an emulsion of phenyl beta naphthylamine was added to stabilize the rubber (2% of the stabilizer based on rubber). The latex was then coagulated by means of saturated brine solution and thoroughly washed. The crumb precipitate was dried and then evaluated in the usual manner. The data obtained are set out as run #1 in the table below.

The foregoing procedure was repeated except that 5.2 grams of mercaptans instead of 6.5 g. were added initially and 2.6 grams instead of 3.25 grams were added at the end of 3 hours and again at 50% conversion. In this run, only 75% of the total butadiene was added initially, the rest being added in two equal portions at approximately 30% and again at 55% conversion. The data obtained is set out as run #2 in the following table:

| | Time, hours | Per cent conversion | Per cent acrylonitrile in copolymer | Tensile | Ultimate elongation | Williams plasticity |
|---|---|---|---|---|---|---|
| Run #1 | 10½ | 71½ | 39.3 | 3,000 | 550 | 57-0 |
| Run #2 | 11 | 72½ | 41.5 | 3,475 | 815 | 57-1 |

It may be clearly seen from these results that the product obtained in run #2 in accordance with my invention possesses a substantially improved elongation as compared with the product of run #1. It is further noted that run #2 overall gives products of better tensile strength than run #1 with equally good plasticity although less mercaptan modifier was used. A further advantage of my procedure is shown by the fact that with a given concentration charged and substantially the same time and conversion a product was obtained having a higher nitrile content. This is highly advantageous since of course the higher the nitrile content, the more resistant the polymer is towards oils and solvents. Equally good results are obtained in my process if isoprene is used instead of butadiene.

Example 2

The following table summarizes the results of several runs that were made in an attempt to prepare an interpolymer containing about 45–50% of nitrile which would be suitable in the manufacture of self-sealing fuel tanks. The conditions applied were substantially the same as in the above example, except that sodium oleate was used as the emulsifier and different ratios of butadiene to acrylonitrile were used as shown in the first column.

| Per cent acryonitrile | | Temp. | Time | Per cent conv. | Tensile | Per cent elong. | Williams plasticity | Per cent volume incr. | |
|---|---|---|---|---|---|---|---|---|---|
| Feed | Product | | | | | | | 85-15 kerosene-benzol | 40% arom. gasoline |
| | | °C. | Hours | | | | | | |
| 60 | 47.5 | 30–40 | 9 | 80 | 3,660 | 260 | 284 | 2.8 | 11.4 |
| ¹ 65 | 50.6 | -------- | 10 | 80 | 3,810 | 420 | 252-114 | 1.65 | 5.9 |
| ² 65 | 48.4 | -------- | 11½ | 78 | 3,165 | 560 | 224-161 | 1.6 | 9.9 |

¹ ½ of butadiene added initially and ¼ after 5½ hours and after 7 hours.
² Octyl instead of Lorol mercaptan and only ½ of butadiene added initially and ⅙ after 3½, 4½, and 7½ hours.

The percentage increase in volume tabulated is determined by subjecting a sample of the polymer to the action of the solvents named for 48 hours. The 40% aromatic gasoline used was Esso Aviation 100 octane gasoline, the aromatics of which consisted of 5% benzene, 20% toluene and 15% xylene.

From these data it is apparent that the addition of some of the butadiene portionwise gives a more plastic rubber, better elongation properties and a somewhat better oil resistance for a given nitrile content.

*Example 3*

In order to get 45-50% of combined acrylonitrile in a diolefin-acrylonitrile copolymer such as that of butadiene and acrylonitrile, and at the same time to get a product in which all of the individual polymer molecules are fairly uniform as far as nitrile content is concerned, it has been found necessary to employ an acrylonitrile-butadiene ratio of from about 85/15 to 90/10 in the feed. This is accomplished by adding a major part of the butadiene during the run. When using an overall ratio of 60 parts acrylonitrile and 40 parts of butadiene, the butadiene was added about as follows:

12 parts initially
10 parts when acrylonitrile/C₄H₆ in feed reaches 90/10
8 parts when acrylonitrile/C₄H₆ in feed reaches 90/10
6 parts when acrylonitrile/C₄H₆ in feed reaches 90/10
4 parts when acrylonitrile/C₄H₆ in feed reaches 90/10

The polymerization was stopped when the conversion reached 73-74% conversion based on 100 parts of total reactants. When following such a process and, using besides the reactants:

| | Parts |
|---|---|
| Water | 200 |
| Sodium oleate | 5 |
| Lorol mercaptan | 0.5 |
| Ammonium persulfate | 0.3 | a product containing 46% of combined nitrile was obtained. The synthetic rubber was quite processable as indicated by a Williams plasticity of 77—0. The vulcanizate had a tensile strength of 2580#, an elongation of 770%, and a Shore hardness of 72. It expanded 5.0% in the kerosene-benzol immersion test. This experiment further indicates how a relatively soft and processable rubber containing as much as 46% of acrylonitrile can be obtained if care is taken to avoid the formation of a considerable part of the polymers having very high nitrile contents.

It is noted that in evaluating the compounded co-polymers prepared in accordance with the present invention, the following formula was used:

| | Parts |
|---|---|
| Diolefin-nitrile copolymer | 100 |
| Stearic acid | 1.5 |
| Sulfur | 1.5 |
| Zinc oxide | 5 |
| Carbon black | 45 |
| Wood rosin | 4 |
| Coal tar | 4 |
| Altax | 1.25 |
| Diphenylguanidine | 0.25 |

The admixture of the ingredients of the formula was cured at approximately 140° C. for 45 minutes. In each case volume increase tests were carried out for 48 hours at 30° C.

What I claim and desire to secure by Letters Patent is:

1. In the process of preparing interpolymers of a conjugated diolefin of from four to about six carbon atoms per molecule and a nitrile of the formula

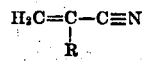

wherein R stands for a member of the group consisting of hydrogen methyl and ethyl, containing more than about 35% of combined nitrile, in aqueous emulsion the improvement which consists of adding all the nitrile and from about 25 to 75% of the total diolefin to the reaction mixture, subjecting the reaction mixture to polymerizing conditions and adding the remainder of the diolefin portionwise after about 25% conversion of the initial charge has been reached.

2. In the process of preparing emulsion copolymerizates of a conjugated butadiene hydrocarbon and a nitrile of the formula

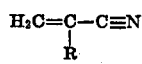

wherein R stands for a member of the group consisting of hydrogen, methyl and ethyl, containing more than about 35% of combined nitrile, the improvement which consists of adding all the nitrile and from about 25 to 75% of the total butadiene hydrocarbon to the reaction mixture, subjecting the reaction mixture to polymerizing conditions and adding the remainder of the butadiene hydrocarbon portionwise after about 25% conversion of the initial charge has been reached.

3. The process as defined in claim 2 wherein about 50% of the butadiene hydrocarbon is added to the polymerization mixture initially, and the remainder is added portionwise during the polymerization.

4. The process of preparing emulsion copolymerizates of butadiene and acrylonitrile containing more than about 35% of combined nitrile, which comprises preparing an emulsion of the total amount of acrylonitrile and about 50% of the total butadiene for the charge, subjecting the resultant emulsion to polymerization conditions in the presence of a polymerization catalyst capable of liberating oxygen under reaction conditions and an aliphatic mercaptan polymerization modifier containing at least 6 carbon atoms per molecule, and adding the remainder of the butadiene portionwise to the emulsion after about 25% conversion of the initial charge has been reached.

5. The process of preparing emulsion copolymerizates of isoprene and acrylonitrile containing more than about 35% of combined nitrile, which comprises preparing an emulsion of the total amount of acrylonitrile and about 50% of the total isoprene for the charge, subjecting the resultant emulsion to polymerization conditions in the presence of a polymerization catalyst capable of liberating oxygen under reaction conditions and an aliphatic mercaptan polymerization modifier containing at least 6 carbon atoms per molecule, and adding the remainder of the isoprene portionwise to the emulsion after about 25% conversion of the initial charge has been reached.

6. The process of preparing emulsion copolymerizates of butadiene and acrylonitrile containing more than about 35% of combined nitrile, which comprises preparing an aqueous emulsion of a mixture of about 1 to 1.5 parts of butadiene and about two parts of acrylonitrile, subjecting the resultant emulsion to polymerization conditions in the presence of a polymerization catalyst capable of liberating oxygen under reaction conditions and an aliphatic mercaptan polymerization modifier containing at least 6 carbon atoms per molecule, and adding sufficient butadiene portionwise to the emulsion after about 25% conversion of the initial charge has been reached in sufficient quantities that the total amount of butadiene supplied is equal to the acrylonitrile used.

7. The process of preparing emulsion copolymerizates of butadiene and acrylonitrile containing about 45-50% of combined nitrile, which comprises preparing an aqueous emulsion of a mixture of about 1 to about 1.5 parts of butadiene and about 4 parts of acrylonitrile, subjecting the resultant emulsion to polymerization conditions in the presence of a polymerization catalyst capable of liberating oxygen under reaction conditions and an aliphatic mercaptan polymerization modifier containing at least 6 carbon atoms per molecule, and adding butadiene portionwise to the emulsion after about 25% conversion of the initial charge has been reached in sufficient quantity that the total amount of butadiene supplied is slightly more than half the quantity of acrylonitrile used.

BYRON M. VANDERBILT.